W. Wright,
Piston Packing,
Nº 6,146.        Patented Feb. 27, 1849.
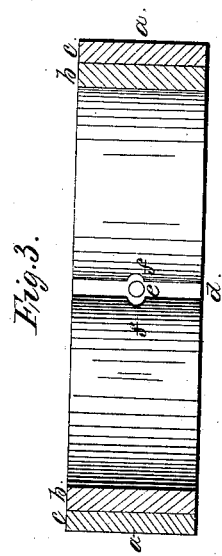
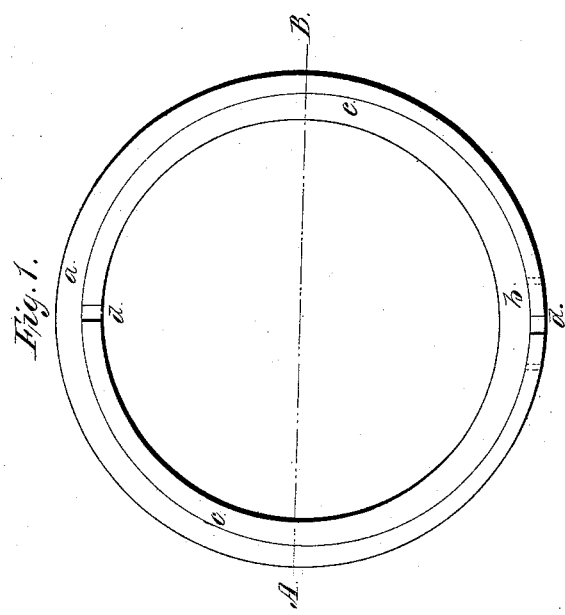
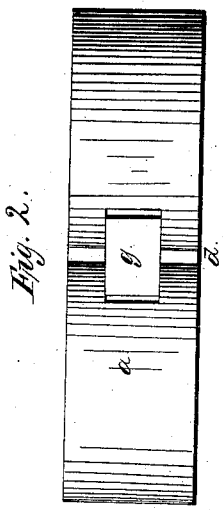

UNITED STATES PATENT OFFICE.

WILLIAM WRIGHT, OF PROVIDENCE, RHODE ISLAND.

METALLIC PACKING FOR PISTONS.

Specification of Letters Patent No. 6,146, dated February 27, 1849.

*To all whom it may concern:*

Be it known that I, WILLIAM WRIGHT, of Providence, State of Rhode Island, have invented certain new and useful Improvements in Metallic Packing for the Pistons of Steam-Engines, and that the following is a full, clear, and exact description of the principle or character which distinguishes it from all other things before known and of the manner of making, constructing, and using the same, reference being had to the accompanying drawings, making part of this specification, in which—

Figure 1 is a plan; Fig. 2, an elevation; and Fig. 3 a vertical section taken at the line (A B) of Fig. 1.

The same letters indicate like parts in all the figures.

All the attempts heretofore made with metallic packing rings for pistons have presented serious difficulties, and the most serious has been the inequality of the elasticity, for if a ring, or the sections of a ring, be made of equal thickness the bending will take place principally in the middle, and therefore when expanded or contracted it will not retain its circular form. To avoid this, on the Glasgow and Ayr Railway the pistons of the locomotives have been packed with two cut rings one above the other, each formed of a gradually reduced thickness toward the ends; but experience has shown that even when thus made they do not bend equally, and as no mode was adopted of retaining them always in the same relative and opposite position, they produce an unequal wear of the cylinder, and when first inserted but seldom fit accurately; but the most serious objection is that the periphery of the piston must be eccentric which precludes the possibility of turning the packing to avoid unequal wear.

The object of my improvement is to avoid these defects, and to this end my invention consists in making elastic metallic packing for the pistons of steam engines of two cut rings, one within the other and each made of a gradually reduced thickness toward the ends so that when inserted one within the other the outer and the inner peripheries of the compound ring shall be concentric while the line of separation between the two shall be eccentric, when this is combined with a projecting pin which lies in the space between the ends of the inner ring, to retain the thickest part of one ring always opposite the open and thinnest part of the other.

In the accompanying drawings (*a*) represents an outer, and (*b*) an inner ring of metal, turned to perfect circles, but the inner periphery of each is eccentric to the outer periphery, and both in the same proportion so that when one ring is inserted within the other the inner and outer peripheries of the compound ring shall be concentric, and the line (*c*) dividing the two eccentric.

At the thinnest part a short piece is cut out of each ring as at (*d, d,*) so that they can be contracted or reduced in diameter, and when the two rings are put together the thickest part of one must be placed opposite the thinnest part of the other, and vice versa, and to insure the retaining of this relative position the inner periphery of the outer ring is provided with a projecting pin (*e*) which lies in the space between the ends of the inner ring which have each a semicircular cavity (*f, f*) corresponding with the pin (*e*) to admit of closing the ring without griping the pin. At the thinnest part of the outer ring a small plate (*g*) is fitted having an inner surface corresponding to the periphery of the inner ring and the outer surface corresponding to the periphery of the outer ring—the same lying in the open space between and embraced by recesses in the open ends of the outer ring which are cut out for this purpose. This plate being thus embraced by the ends of the outer ring cuts off the passage of steam which would otherwise pass through the opening in the outer ring. The spaces cut out of the ends of the outer ring to embrace the plate are made of sufficient depth to admit of contracting the ring.

From the foregoing it will be seen that any irregularity in the bending of the one ring will be compensated by the other for the two must bend together, and the thickest part of one is always opposite the thinnest part of the other, and by the projecting pin the relative position of the two must always be preserved and at the same time when the two are put together the inner and the outer periphery are concentric and therefore the packing can be turned at pleasure on the piston and retain its concentric position in the cylinder.

What I claim as my invention and desire to secure by Letters Patent is—

The making of metallic packing for the pistons of steam engines, of two cut rings one within the other, the outer and the inner peripheries of the compound ring being concentric, and the division between them eccentric, substantially as herein described, when this is combined with the mode of keeping the two rings with their thickest parts on opposite sides of the common center by the projecting pin attached to the outer ring, and the plate embraced by the ends of the outer ring to cut off the passage of steam, substantially as described.

WM. WRIGHT.

Witnesses:
E. J. NIGHTINGALE,
BENJAMIN T. EVANS.